Feb. 26, 1957 A. COLONNA 2,782,706
FILTER LEACHER FOR COFFEE URNS
Filed Dec. 24, 1953 2 Sheets-Sheet 1

Angelo Colonna
INVENTOR.

BY
Attorneys

Feb. 26, 1957　　　　　A. COLONNA　　　　　2,782,706
FILTER LEACHER FOR COFFEE URNS
Filed Dec. 24, 1953　　　　　　　　　2 Sheets-Sheet 2

Angelo Colonna
INVENTOR.

BY
Attorneys

United States Patent Office 2,782,706
Patented Feb. 26, 1957

2,782,706

FILTER LEACHER FOR COFFEE URNS

Angelo Colonna, Philadelphia, Pa.

Application December 24, 1953, Serial No. 400,230

6 Claims. (Cl. 99—315)

The present invention relates to certain new and useful improvements in coffee making urns and has reference, in particular, to a sectional stainless steel or equivalent leacher which dispenses with the use of cloth bags, filter papers, and other filtering material which, as is well known in the art, not only becomes soiled and stained but are undesirably contaminated with caffein and other coffee constituents which not only effect the taste of the coffee beverage but render it unwholesome under certain adverse conditions.

In carrying out the principles of the instant concept a novel leacher has been evolved and produced, the same being characterized by inner and outer relatively deep and shallow basket-like strainers with the inner strainer telescopically and removably fitted into the outer one and with both having highly perforated bottoms in immediate contact with each other but which are separable so that all surfaces of these respective strainers may be scalded, sterilized, and rendered clinically clean for reliable and endorsed use.

Another object of the invention has to do with a twin-strainer leacher wherein simple, practical and easy-to-use means is embodied in the responsive strainers so that they may be brought together in assembled predetermined relationship and securely maintained in such relationship in order that the holes in the bottom of the inner strainer are disaligned and thus appropriately staggered in relation to the holes in the bottom of the outer strainer.

More explicitly, novelty is predicated on the provision in the respective bottoms of the inner and outer strainers of spaced parallel relatively large extrusions which are nested together and which constitute easy-to-see guides to make it possible to quickly line-up keeper notches in the wall of the inner strainer with keepers or detents formed, by way of indentations, in the wall of the outer strainer.

A still further objective in reducing the invention to practice is to provide the twin-strainer leacher with a readily insertable and removable pan-like closure, this having a wall portion telescoped into the upper wall portion of the outer strainer and also having a perforated bottom for distributing the water and satisfactorily confining the ground coffee between itself and the underlying cooperating portions of the inner and outer strainers.

What is more, novelty is predicated on the stated pan-like closure which has a flange on the upper edge of its wall portion resting on the beaded upper edge of the wall on the outer strainer and wherein special supporting clips for the outer strainer have upper hook-shaped ends with their hook or bill portions overhanging the beaded edge cooperating with the notched flange of the closure to separably but securely lock the latter in its intended ready-to-use position.

Objects, features and advantages in addition to those explicitly mentioned will, of course, became evident from the following specification as well as from the subjoined claims.

In the drawings wherein like numerals are employed to designate like parts throughout the views.

Figure 1:
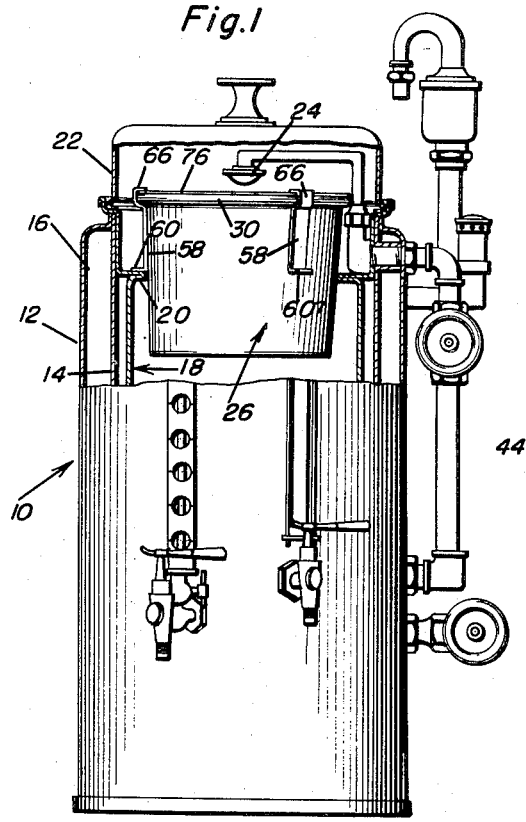
Figure 1 is a view in section and elevation of a coffee making urn showing the improved filtering sanitary-type leacher supported therein in readiness for use.
Figure 5:
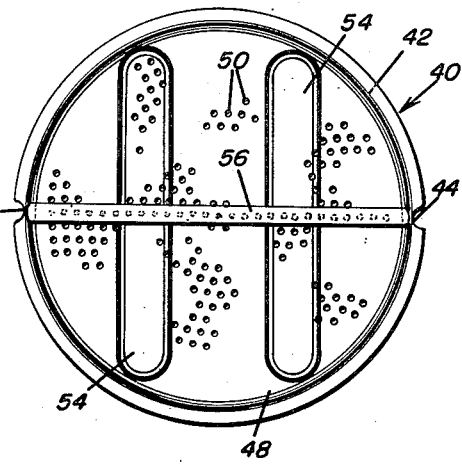
Figure 5 is a plan view of the inner strainer by itself.

Reference is made first to the complete assemblage shown in Figure 1. This view is employed to illustrate what a leacher is and how it is fitted and used in what may be called a more or less conventional type coffee making urn. Without attempting to set forth the details of the pipes, gauges and draw-off spigots it will be sufficient, insofar as this view is concerned to denote the water jacket or boiler by the numeral 10, this comprising an outer wall or casing 12 in spaced relation to an inner air cell or wall 14 with the water space 16 therebetween. The insertable and removable coffee vessel is denoted by the numeral 18 and this has a supporting ledge 20 for the insertable and removable leacher. The cover is denoted at 22 and, for convenience, the hot water spray head or nozzle is denoted at 24. As stated, the invention is in the leacher and the rest of the description will be presented accordingly.

Figure 6:
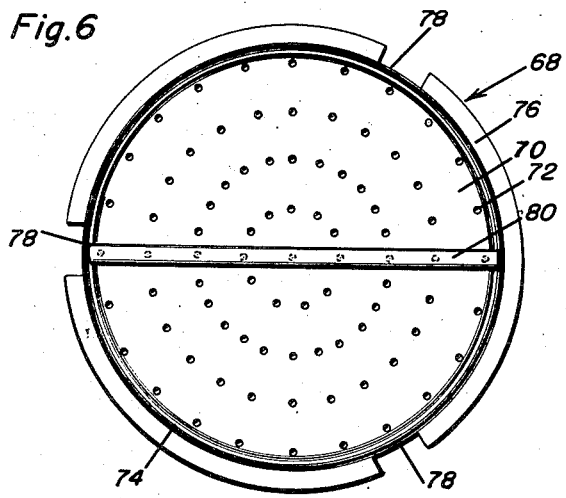
Figure 6 is a plan view of the cover or closure section by itself.
Figure 7:
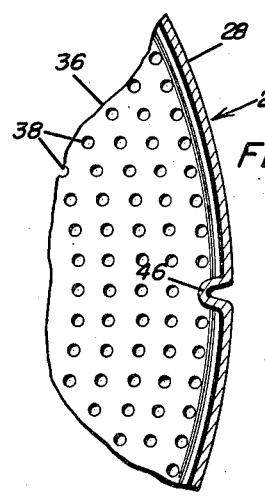
Figure 7 is an enlarged fragmentary section on the horizontal line 7—7 of Figure 3 looking in the direction of the arrows.
Figure 2:
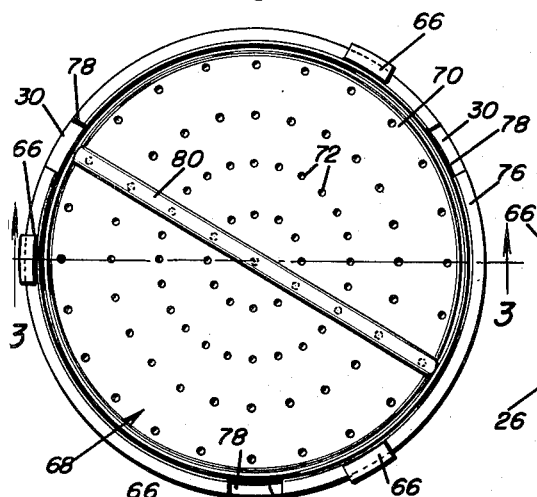
Figure 2 is a plan view of the leacher per se with all of the parts assembled.
Figure 4:
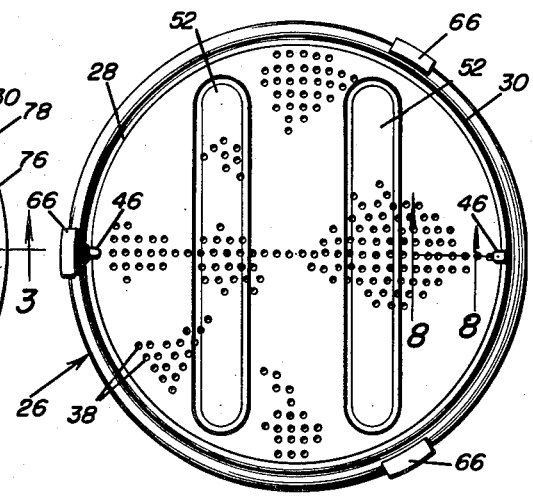
Figure 4 is a plan view of the outer strainer by itself.
Figure 3:
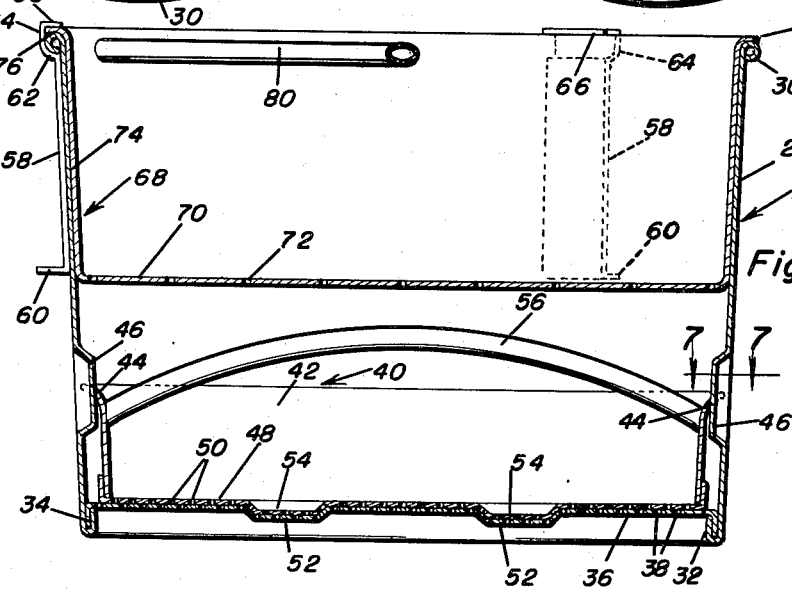
Figure 3 is a view in section and elevation taken on the line 3—3 of Figure 2 looking in the direction of the arrows.

With reference to Figure 3 the details of construction will be clear. Here as is shown the basket-like outer receptacle which is here referred to as the outer strainer is denoted by the numeral 26 and it comprises an annulus which may be conveniently referred to as a wall 28 having a bead 30 on its upper end and having its lower end formed with a return bend 32 which secures the marginal flange 34 of the bottom 36 fixedly in place. This is, of course, the main bottom and it is provided with a plurality of perforations or holes 38. The insertable and removable relatively shallow basket-like unit is here called the inner strainer and it is generally denoted by the numeral 40. It comprises an imperforate wall 42 having diametrically opposite keeper notches 44 releasably engaged with indentations 46 in the wall 28 which constitutes keepers. Here the bottom is denoted by the numeral 48 and this rests in direct contact with the bottom 36 and has perforations or holes 50 which are out of line with the holes 38. The elongate indentations or extrusions 52 serve to seat corresponding extrusions or indentations 54, the latter being nested in 52 in the manner shown and these respective extrusions serving as easy-to-see guides in lining up the inner strainer with the outer strainer to assemble the same with requisite expediency. An appropriate handle 56 is provided for the inner strainer to permit it to be readily placed in position and lifted out and removed. While it is relatively easy to find the keepers 46 and to line the same up with the keeper notches 44, it is much easier for the novice at least to be sure and line up 54 with 52 and to thus quickly assemble the strainers before the ground coffee is placed in and before the leacher is installed in the urn. It might be stated in this connection that the outer strainer is provided with supporting legs or clips. Any number of these are used and each one is in the form of a metal strip or leg which is denoted by the numeral 58, the same being welded in place and the lower end thereof being laterally bent at 60 to provide a supporting foot which rests on the ledge or flange 20 in the manner shown in Figure 1. The upper end portion of the clip is curved and bent as at 62 to accommodate and clear the bead and is then bent again as at 64 and 66 to define holddown and clamping hooks, the bill portions being spaced above the bead 30 in the manner shown. These clips come in handy in assembling and retaining the insertable and removable pan-like closure section or unit 68. This again is of stainless steel and is a readily applicable and removable member and is pan-shaped and comprises a bottom 70 which is apertured at 72 to distribute the incoming hot water from the spray-head 24. This spreads the water so that it is effectively allowed to drip down through the ground coffee which is of course placed in the space between the bottom 70 of the closure section and the respective contacting bottoms of the aforementioned strainer units. The imperforate wall 74 is fitted telescopically within the upper wall portion of the wall 28 and there is an outstanding lateral flange 76 on the upper end of the wall which overhangs the bead 30. This flange as shown in Figure 6 is provided at equidistant circumferentially spaced points with notches 78 which may be conveniently called clip clearance notches. The numeral 80 designates a handle for handling and otherwise inserting and removing the closure and lidding 68. This member is obviously placed in position so that the notches 78 line up with the hold-down clips or hooks 66. Then the entire member or unit is turned so that the notches are then disaligned in respect to the hooks and the hooks serve as hold-down members for the flange 76 all as is clear and as is satisfactorily illustrated in Figure 3 taken in conjunction with the other figures.

Figure 8:
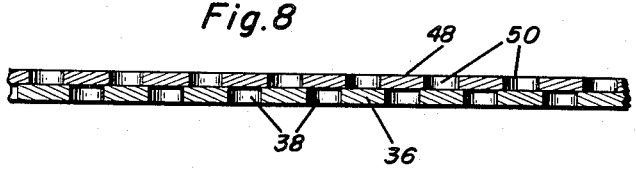
Figure 8 is an exaggerated section on the line 8—8 of Figure 4 which serves to bring out the staggered relationship of the cooperating bottoms of the inner and outer strainers or sections.

The manner in which the parts are constructed is shown in the views taken singly and collectively and particularly illustrated with the parts assembled in Figure 3. Thus, the simple triple-section leacher constitutes a novel and practical sanitary assemblage which in use is supported in the urn in the manner illustrated in Figure 1 at which time the feet 60 of the aforementioned leg portions 58 of the clips rest on the ledge 20. The additional function wherein the hooked shaped upper end of the clips serve as hold-down clamps for the flanged portion of the closure unit 68 is of course important. Primarily, however, the invention has to do with the two strainer units 26 and 40 and especially with the staggered arrangement of holes in the respective bottoms as brought out in Figure 8. With this arrangement the desired filtration is had and any filtrate which remains between the intimately related bottoms 36 and 48 can be washed away when the leacher is removed from the urn and all of its several sections separated and scalded or otherwise sterilized. So-called strainers and filters may be employed in the prior art wherein spaced plates are apertured and even with the apertures disaligned. There are none in which the disalignment is maintained by way of the keeper notches and keepers and especially wherein the strainer bottoms are bodily separable for satisfactory cleansing results.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. For use in a coffee making urn, a sectional leacher which is easy to assemble and disassemble and equally easy to sterilize and keep clinically clean, an outer strainer comprising a relatively deep basket-like receptacle for ground coffee embodying a perforated bottom and an upstanding imperforate marginal wall provided with diametrically opposite indentations constituting keepers, an inner insertable and removable relatively shallow basket-like strainer fitted telescopically into said outer strainer and having a perforated bottom resting atop said first named bottom and provided with perforations out of line with the perforations in said first named bottom and also having an upstanding wall provided with keeper notches in which said keepers are separably seated, said inner strainer having a handle to facilitate expeditious handling and use thereof relative to the complemental outer strainer, the respective bottoms of said strainers having elongate extruded portions separably nested together and serving as handy guides in quickly lining up the keeper notches with their cooperating keepers.

2. The structure defined in claim 1, and the combination therewith of a readily atachable and detachable coffee lidding and hot water distributing tray, the latter constituting a closure for the otherwise open top portion of said outer strainer and also having a perforated bottom and an imperforate upstanding wall, the latter telescoped into the upper wall portion of the outer strainer and having an outstanding flange resting atop the upper edge of the wall of said outer strainer.

3. The structure defined in claim 1, and the combination therewith of a readily attachable and detachable coffee lidding and hot water distributing tray, the latter constituting a closure for the otherwise open top portion of said outer strainer and also having a perforated bottom and an imperforate upstanding wall, the latter telescoped into the upper wall portion of the outer strainer and having an outstanding flange resting atop the upper edge of the wall of said outer strainer, said last named wall having fixed hook-shaped hold-down and retaining clips, and said flanges having clearance notches cooperable with said clips, and the lower end portions of said clips having lateral outstanding bends defining supporting feet and a handle, independent of said first named handle, for lifting, lowering, carrying and otherwise handling the leacher as a three-part assembly.

4. For use in a coffee making urn, a readily insertable and removable leacher comprising a receptacle for ground coffee, said receptacle having an imperforate vertical wall and a fixed perforated bottom providing an outer strainer, an insertable and removable inner strainer having a perforated bottom, superimposed on and covering said first named perforated bottom, the perforations of said latter bottom being constantly out of alignment with the perforations in said first mentioned bottom, and cooperating means between the walls of said strainers whereby they are separably keyed in a manner to hold the respective bottoms in place to maintain the intended staggered relation between the respective perforations, said first bottom being provided with elongate extruded portions and said second bottom having corresponding extruded portions, the respective extruded portions being separably nested together and constituting visual guides which assist one in lining up the inner strainer with the outer strainer during the assembling step.

5. For use in a coffee urn, a sectional leacher which is easy to assemble and disassemble and equally easy to sterilize and keep clinically clean, an outer strainer comprising a relatively deep basket-like receptacle for ground coffee embodying a perforated bottom and an upstanding imperforate marginal wall provided with diametrically opposite indentations constituting keepers, an inner insertable and removable relatively shallow basket-like strainer fitted telescopically into said outer strainer and having a perforated bottom resting atop said first named bottom and provided with perforations out of line with the perforations in said named bottom and also having an upstanding wall provided with keeper notches in which said keepers are separably seated, said inner strainer having a handle to facilitate expeditious handling and use thereof relative to the complemental outer strainer, the respective bottoms of said strainers having elongate extruded portions separably nested together and serving as handy guides in quickly lining up the keeper notches with their cooperating keepers, a readily attachable and detachable coffee lidding and hot water distributing tray, the latter constituting a closure for the otherwise open top portion of said outer strainer and also having a perforated bottom and an imperforate upstanding wall, said tray telescoping into the upper wall portion of the outer strainer and having an outstanding flange resting atop the upper edge of the wall of said outer strainer, said tray also having a handle, independent of said first named handle, for lifting, lowering, carrying and otherwise handling the leacher as a three-part assembly, and means carried by the wall of the tray and releasably joining the flange of the tray to the upper edge of the wall of said outer strainer.

6. A leacher for use in a coffee urn comprising an outer strainer embodying an imperforate annulus defining a wall and having a bead at the upper end of said wall, a perforated bottom fitted in said annulus and thus defining a basket-like holder and strainer for ground coffee, said annulus, being provided at diametrically opposite points and in a plane above said bottom with indentations providing keepers for an insertable and removable inner strainer, clips superimposed against and secured to the upper exterior surface of said annulus and having their lower ends laterally directed and providing supporting feet, the upper ends of said clips being bent upon themselves and fashioned into hooks having bill portions overlying the bead in spaced relation, a readily applicable and removable ground coffee lidding and leacher closure having a perforated flat bottom and an upstandiing marginal imperforate wall telescoping into the upper portion of the outer strainer, the upper end of said leacher wall being provided with an outstanding flange resting on said bead and having circumferentially spaced clearance notches in cooperation with the aforementioned hooks, said closure having a handle for lifting, lowering, carrying and otherwise handling the leacher as an assembly.

References Cited in the file of this patent

UNITED STATES PATENTS

| | | |
|---|---|---|
| 639,131 | Angus | Dec. 12, 1899 |
| 814,460 | Kruckewitt | Mar. 6, 1906 |
| 929,388 | Clement | July 27, 1909 |
| 936,997 | Grimm | Oct. 12, 1909 |
| 1,008,861 | Piaseczny | Nov. 14, 1911 |
| 1,143,022 | Barabas et al. | June 15, 1915 |
| 1,528,601 | Bozzalla | Mar. 3, 1925 |
| 1,613,483 | Richheimer | Jan. 4, 1927 |
| 2,061,119 | Voigt | Nov. 17, 1936 |
| 2,069,939 | Browning | Feb. 9, 1937 |
| 2,240,721 | Selitzky | May 6, 1941 |
| 2,338,251 | Makino | Jan. 4, 1944 |